(12) United States Patent
Hammerschmidt

(10) Patent No.: US 9,647,716 B2
(45) Date of Patent: May 9, 2017

(54) SENSOR DEVICE AND SENSOR ARRANGEMENT

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/850,701

(22) Filed: Sep. 10, 2015

(65) Prior Publication Data

US 2016/0087672 A1    Mar. 24, 2016

(30) Foreign Application Priority Data

Sep. 18, 2014 (DE) ........................ 10 2014 113 456

(51) Int. Cl.
*H04B 1/401* (2015.01)
*H04B 1/04* (2006.01)
(Continued)

(52) U.S. Cl.
CPC ........... *H04B 1/401* (2013.01); *H04B 1/0475* (2013.01); *H04L 1/00* (2013.01); *H04L 1/20* (2013.01);
(Continued)

(58) Field of Classification Search
CPC .. B60R 2021/01054; B60R 2021/0104; B60R 2021/01109; H04L 1/0002; H04L 1/0003;
(Continued)

(56) References Cited

U.S. PATENT DOCUMENTS 5,946,355 A * 8/1999 Baker ............... H04L 25/03866
341/56
6,167,057 A * 12/2000 Kishigami ............ H04L 1/0083
370/445
(Continued)

OTHER PUBLICATIONS

Suhonen et al., "Chapter 1: Low-power WSN Technology," Low-Power Wireless Sensor Networks, Protocols, Services and Applications, Springer, 2012, 11 pp. (Applicant points out that, in accordance with MPEP 609.04(a), the 2012 year of publication is sufficiently earlier than the effective U.S. filing date and any foreign priority date of Sep. 18, 2014 so that the particular month of publication is not in issue.).
(Continued)

*Primary Examiner* — Sophia Vlahos
(74) *Attorney, Agent, or Firm* — Shumaker & Sieffert, P.A.

(57) ABSTRACT

An integrated sensor device (130) according to an embodiment includes a sensing element (140) and a communication interface (150) to communicate with an external control device (110). The communication interface (150) includes a receiver circuit (160) to receive, from the external device, a signal indicating a request to change a transmission mode, and a transmitter circuit (170) to change the transmission mode based on the received signal. By using an embodiment, it may be possible to improve a trade-off between a robustness of a system comprising a sensor even under adverse operational conditions, simplifying such an implementation or architecture, its energy consumption and a bandwidth of its infrastructure.

23 Claims, 5 Drawing Sheets

(51) Int. Cl.
*H04W 4/00* (2009.01)
*H04L 1/00* (2006.01)
*H04L 1/20* (2006.01)
*B60R 21/01* (2006.01)

(52) U.S. Cl.
CPC ....... *H04W 4/00* (2013.01); *B60R 2021/0104* (2013.01); *B60R 2021/01054* (2013.01); *H04W 4/006* (2013.01)

(58) Field of Classification Search
CPC .... H04L 1/00; H04L 1/20; H04B 3/54; H04B 1/0475; H04B 1/401
See application file for complete search history.

(56) References Cited

U.S. PATENT DOCUMENTS

| | | | | |
|---|---|---|---|---|
| 7,027,420 | B2* | 4/2006 | Hamalainen | H04L 1/0009 370/252 |
| 7,428,424 | B2* | 9/2008 | Hwang | H04W 52/143 455/115.3 |
| 8,106,788 | B2* | 1/2012 | Ohl | G01D 3/022 340/439 |
| 2007/0257880 | A1* | 11/2007 | Nakao | G09G 3/3406 345/102 |
| 2008/0096496 | A1* | 4/2008 | Yoon | H04W 52/262 455/102 |
| 2009/0299675 | A1* | 12/2009 | Isaacson | A61B 5/14551 702/104 |
| 2010/0069066 | A1* | 3/2010 | Shen | H04J 11/0093 455/434 |
| 2011/0169574 | A1* | 7/2011 | Bi | H03F 3/45197 330/304 |
| 2012/0239256 | A1 | 9/2012 | Hammerschmidt et al. | |
| 2013/0198802 | A1* | 8/2013 | Ricci | H04L 63/10 726/1 |
| 2013/0208775 | A1* | 8/2013 | Wang | H04B 3/46 375/224 |
| 2014/0153063 | A1* | 6/2014 | Azumai | H04N 1/4056 358/474 |

OTHER PUBLICATIONS

Suhonen et al., "Chapter 2: Key Standards and Industry Specifications," Low-Power Wireless Sensor Networks, Protocols, Services and Applications, Springer, 2012, 11 pp. (Applicant points out that, in accordance with MPEP 609.04(a), the 2012 year of publication is sufficiently earlier than the effective U.S. filing date and any foreign priority date of Sep. 18, 2014 so that the particular month of publication is not in issue.).

Suhonen et al., "Chapter 3: Hardware Platforms and Components," Low-Power Wireless Sensor Networks, Protocols, Services and Applications, Springer, 2012, 12 pp. (Applicant points out that, in accordance with MPEP 609.04(a), the 2012 year of publication is sufficiently earlier than the effective U.S. filing date and any foreign priority date of Sep. 18, 2014 so that the particular month of publication is not in issue.).

Ngo et al., "SIMOSP: A Simple Mode Switch Protocol for Wireless Sensor Networks," Technical Report TR10_09, Oct. 1, 2010, 15 pp.

Steine et al., "Proactive Reconfiguration of Wireless Sensor Networks," MSWiM '11, ACM, Oct. 31-Nov. 4, 2011, 9 pp.

Jafer, "Design Methodologies of Wireless Sensors Instrumentation Systems for Monitoring and Control," Wireless Sensor Networks & Ecol. Monit., SSMI 3, Springer-Verlag Berlin Heidelberg, 2013, 33 pp. (Applicant points out that, in accordance with MPEP 609.04(a), the 2013 year of publication is sufficiently earlier than the effective U.S. filing date and any foreign priority date of Sep. 18, 2014 so that the particular month of publication is not in issue.).

Office Action, in the Korean language, from counterpart Korean Application No. 2017-011875185, dated Feb. 16, 2016, 6 pp.

* cited by examiner

SENSOR DEVICE AND SENSOR ARRANGEMENT

FIELD

Embodiments relate to an integrated sensor device, a control unit, and a method.

BACKGROUND

In many fields of technology physical, chemical and other quantities are to be detected or monitored for different reasons. To detect these quantities, sensors may be used. A location, where these quantities are detected, differs often from a location, where the corresponding data are collected, pre-processed or processed. As a consequence, sensor-related data are transmitted from a sensor to a unit, where the data are at least collected.

While in the many fields of technology and applications, sensor-related data may be transmitted from the sensor to the other unit using highly sophisticated transmission schemes, a tendency exists to simplify the infrastructure used for transmitting these data. In at least some of these fields and applications, comparably rough operating conditions may be present, causing for instance disturbances in the transmissions of the sensors. However, also under these more difficult operational conditions, the availability of the related data may be important or even crucial for operating a machine or a system.

While highly sophisticated transmission schemes including their infrastructures may be capable of operating a sensor even under more severe operational conditions, a tendency exists to simplify an implementation of the infrastructure necessary to transmit sensor-related data from the sensors to a control unit or the like. For instance, the availability of shielding, available space, computational power, energy consumption and other boundary conditions may be limited. Nevertheless, a robust operation of such a system, a simple implementation or architecture and a robust protocol for transmitting data may be desirable. At the same time, a desire exists to increase a bandwidth or an available through-put of data via the resulting infrastructure to be able to provide a large amount of sensor-related data to the other unit and/or to couple as many sensors as possible to the other unit.

For instance, in the field of high volume architectures and low cost implementations, finding a solution to this challenge may be more relevant than in other fields of technology. For instance, sensor-related applications in motorized or non-motorized vehicles may be subjected to a large variety of tough operating conditions and a large number of distortions of different kinds. For instance, distortions may come from electric impulses used to operate systems of the vehicle, which may capacitively or inductively couple into a transmission link used to transmit data from such a sensor to another unit. The situation may further be aggravated by environmental conditions, which may lead to a signal degradation, for instance due to large variations of the temperature or an influence of water. Furthermore, such an infrastructure may be subjected to mechanical stress including, for instance, shocks and vibrations.

Although, in the case of electrical systems and signal transmission schemes, these influences may be more significant than in other transmission schemes, similar challenges do not only arise when using electrical signals, but also using magnetic signals, optical signals or other signals to transmit or exchange data. Moreover, also in other fields of technology, comparable situations may exist including non-high volume architectures and/or non-low cost applications.

SUMMARY

Therefore, a demand exists to improve a trade-off between a robustness of a system comprising a sensor even under adverse operational conditions, simplifying such an implementation or architecture, its energy consumption and a bandwidth of the infrastructure.

This demand may be satisfied by an integrated sensor device, a control unit and a method according to any of the independent claims.

An integrated sensor device comprises a sensing element and a communication interface to communicate with an external control device. The communication interface comprises a receiver circuit to receive, from the external device, a signal indicating a request to change a transmission mode, and a transmitter circuit to change the transmission mode based on the received signal.

It may be possible to improve the previously-mentioned trade-off between the robustness of operation even under adverse conditions, a simple implementation or architecture, energy consumption and the available bandwidth by allowing an external control device to change the transmission mode of the integrated sensor device.

Optionally, in an integrated sensor device the transmitter circuit may be configured to transmit a signal in one of a plurality of transmission modes, wherein the plurality of transmission modes comprises a default transmission mode and at least one further transmission mode allowing the transmission of the signal with a higher robustness against distortions compared to the default transmission mode. Optionally, in an integrated sensor device, the transmitter circuit may be configured to transmit in a predetermined transmission mode after at least one of a power-up of the integrated sensor device, an initialization of the integrated sensor device and in the absence of a signal indicating a request to change the transmission mode different from the transmission mode. Any of these measures may make it possible to increase the robustness against distortions or to increase a data throuput by switching from the predetermined transmission mode to the at least one further transmission mode or the default transmission mode, respectively.

Additionally or alternatively, in an integrated sensor device the at least one further transmission mode may comprise, compared to the default transmission mode, at least one of a reduced transmission speed of a signal to be transmitted, a larger amplitude of the signal to be transmitted, using an error detection code allowing an error detection, using an error detection code allowing an improved error detection, and repeating a message comprising a value of a quantity detected by the sensing element. By implementing one or more of these measures, it may be possible to increase an amount of energy used for transmitting a specific piece of information. As a consequence, a receiver circuit may be capable of more reliably detecting the signal comprising the value of the quantity detected by the sensing element even under adverse operating conditions. For instance, using an error detection code may introduce additional redundancy such that an overall energy used for transmitting the value of the quantity is increased and the probability of undetected errors is significantly reduced. Similarly, also reducing the transmission speed, using a larger amplitude and/or repeating the message may increase the energy used for transmitting the value of the quantity.

Additionally or alternatively, in an integrated sensor device the plurality of transmission modes may comprise a plurality of further transmission modes. This may allow the external control device to switch the integrated sensor device from the default transmission mode to one of at least two different further transmission modes providing a higher robustness against distortions compared to the default transmission mode. For instance, depending on the kind of distortion, the external control unit may choose the most promising further transmission mode of the plurality of transmission modes. The plurality of transmission modes may offer the possibility of counteracting different kinds of distortions and/or provide the opportunity of transmitting a signal indicating the value of the quantity detected by the sensing element more reliably depending on the present distortions. The plurality of further transmission modes may additionally or alternatively comprise further transmission modes offering a more robust transmission compared to one or more of the further transmission modes. Therefore, it may be possible to implement a hierarchy of transmission modes, which can be used in case the number of distortions or the strength of the distortions increases.

Additionally or alternatively, the integrated sensor device may be configured to be coupled to a power supply, wherein the integrated sensor device may be configured to at least one of increase an amplitude of the transmitted signal in response to a higher electrical power provided by the power supply and improve the integrated sensor's power supply rejection ratio (PSRR) in response to a higher electrical power provided by the power supply.

Additionally or alternatively, the integrated sensor device may be configured to notice that the supply was increased by the ECU and take this as an indication to change to a more reliable protocol option, to transmit the data from the integrated sensor device to the external device with more energy, redundancy or time per piece of information and, hence, work more reliably in a distorted environment.

Additionally or alternatively, in an integrated sensor device the sensing element may be configured to detect a value of the quantity, wherein the sensing element may be coupled to the communication interface, and wherein the communication interface may be configured to transmit a signal indicating the detected value of the quantity. Optionally, the integrated sensor device may further comprise a processing circuit coupled between the sensing element and the communication interface, wherein the processing circuit may be configured to process the detected value of the quantity and to provide the processed value of the quantity to the communication interface, and wherein the communication interface may be configured to transmit the signal indicating the processed value. For instance, the integrated sensor device may, therefore, be capable of applying calibration data to a sensor signal provided by the sensing element. However, also more complex signal processing algorithms and/or manipulations may be applied, for instance, based on a look-up table, or other data processing algorithms.

Additionally or alternatively, an integrated sensor device may comprise a monitor circuit to monitor a quality of the received signal and to change the transmission mode to a transmission mode allowing transmitting a signal with a higher robustness against distortions, when the quality of the received signal indicates a degradation of the quality of the received signal. An integrated sensor device may therefore further allow to monitor the quality of the received signals itself and to take action in case a degradation of the received signals is observed. This may also improve the robustness of the operation in adverse operation conditions independent of the influence of an external control unit. The received signals may, for instance, comprise signals indicating a request to the integrated sensor device, status messages, and requests to other devices or the like. For instance, in an integrated sensor device the monitor circuit may be configured to monitor the quality of the received signal based on a statistical analysis.

Additionally or alternatively, in an integrated sensor device the monitor circuit may be configured to detect electrical an indication of an electrical distortion. For instance, the monitor circuit may be configured to detect an increased supply voltage ripple. In this case, the transmitter circuit may be configured to change the transmission mode to a more transmission mode based on a more reliable protocol. For instance, the transmitter circuit may be configured to change to a transmission mode comprising at least one of a reduced speed and increased signal levels. As a consequence, the integrated sensor device may be able to counteract electrical supply problems.

Additionally or alternatively, in an integrated sensor device the communication interface may be configured to transmit a signal asynchronously. By using an asynchronous transmission protocol, an implementation of the integrated sensor device in a larger system may be simplified by avoiding to provide a common clock signal used to transmit a signal to be transmitted.

Additionally or alternatively, in an integrated sensor device the communication interface may be configured to transmit using at least one of a pulse-width-modulation scheme, an amplitude modulation scheme, a transmission scheme based on modulating a current level of a signal to be transmitted, and a transmission scheme based on modulating a voltage level of a signal to be transmitted. Additionally or alternatively, in an integrated sensor device, the communication interface may be configured to use at least one of a PSIx (Peripheral Sensor Interface, Version x) communication protocol, a SPC (Short PWM Code; PWM=Pulse Width Modulation) communication protocol, a SENT (Single Edge Nibble Transmission) communication protocol, a LIN (Local Interconnect Network) communication protocol, and a DSIx (Digital Serial Interface, Version x) communication protocol. In any of these cases, x may be an integer or another version indicator.

A control unit comprises a receiver circuit to receive a signal indicating a value sensed by a sensor device, a monitor circuit to monitor a quality of the received signal and a transmitter circuit to transmit a signal indicating a request to change a transmission mode, when the monitored quality of the received signal indicates at least one of a degradation of the received signal, an improvement of the quality of the received signal and a constant quality of the received signal.

By using such a control unit, it may be possible to improve the previously-mentioned trade-off between the robustness of operation even under adverse conditions, a simple implementation or architecture, energy consumption and the available bandwidth by allowing the control unit to change the transmission mode of a sensor device.

Optionally, in a control unit the monitor circuit may be configured to monitor the quality of the received signal based on a statistical analysis. This may allow the control unit to detect a long term degradation and to ignore only short-time disturbances, which may appear isolated. By ignoring such isolated instances of disturbances, it may be possible to increase an overall throughput and to allow operating the sensor devices at a higher frequency.

Additionally or alternatively, in a control unit the monitor circuit may be configured to monitor the quality of the received signal based at least on one of a verification of an error detecting code, monitoring a timing variation of the received signal, monitoring a message counter comprised in the received signal, and detecting a missing message or a part thereof. The monitor circuit may, therefore, use one or more of a great variety of techniques to detect degradation of the received signal.

Additionally or alternatively, in a control unit the transmitter circuit may be configured to transmit the signal indicating the request to change the transmission mode of the sensor device to transmit the signal with a higher robustness against distortions compared to a default transmission mode after at least one of a power-up of the sensor device, an initialization of the sensor device and in the absence of a signal indicating the request to change the transmission mode. Optionally, in a control unit the transmission mode indicated by the signal may allow, compared to the default transmission mode of the sensor device, at least one of transmitting a signal with a reduced transmission speed of the signal, transmitting a signal with a larger amplitude of the signal, transmitting a signal using an error detection code allowing an error detection, transmitting a signal using an error detection code allowing an improved error detection, and transmitting a signal comprising repeating a message comprising a value of a quantity detected by the sensor device. The control unit may therefore cause the sensor device to switch to a transmission mode having a higher energy per piece of information transmitted. For instance, by using an error detection code or an improved error detection code (additional) redundancy may be introduced such that more energy is transmitted per piece of information. Similarly, by reducing the transmission speed, using a larger amplitude or repeating a message, the amount of energy transmitted may be increased allowing the control unit to detect the information more easily even under adverse operational conditions.

Additionally or alternatively, in a control unit the transmitter circuit may be configured to transmit the signal indicating the request to change to one transmission mode of the sensor device of a plurality of transmission modes of the sensor device, wherein the plurality of transmission modes may comprise the default transmission mode and a plurality of further transmission modes. This may allow the control unit to choose between at least two further transmission modes offering a higher robustness against distortions compared to the default transmission mode, for instance, depending on the kind of distortions detected by the monitor circuit. The control unit may therefore apply selective measures to counteract the influences of distortions monitored by the monitor circuit. As outlined above, it may also be possible to implement a hierarchy of transmission modes to counteract different levels of distortions.

Additionally or alternatively, in a control unit the transmitter circuit may be configured to transmit the signal indicating a request to change the transmission mode to a transmission mode with a higher robustness against distortions, when the monitored quality of the received signal indicates a degradation of the received signal. Additionally or alternatively, in a control unit the transmitter circuit may be configured to transmit the signal indicating a request to change the transmission mode to a transmission mode with a lower robustness against distortions, when the monitored quality of the received signal indicates at least one of an improvement of the quality of the received signal and a constant quality of the received signal. The first option may allow to counter-act a worsening situation with respect to the distortions, while the second options may allow to increase a throuput of data, when the situation allows relaxing the precautions against distortions.

Additionally or alternatively, in a control unit the transmitter circuit may be configured to transmit the signal indicating the request to change the transmission mode of the sensor device to allow transmitting the signal with a lower robustness against distortions compared to the active transmission mode, when the monitored quality of the signal indicates at least one of an improvement of the quality of the received signal and a constant quality of the received signal. This may allow the control unit to switch the sensor device back to a transmission mode with a lower robustness against distortions. This may allow to improve a trade-off between a higher transmission speed and a lower energy consumption. Therefore, when the number of distortions or their severity of the distortions may allow switching back to a transmission mode with a lower robustness against distortions, the control unit may cause the sensor device to do so. For instance, the control unit may verify by switching back even at a constant quality of the received signal if the present transmission mode is still appropriate.

Additionally or alternatively, in a control unit the receiver circuit may comprise an input filter comprising a filter characteristic based on a changeable corner frequency. The receiver circuit may be configured to decrease the corner frequency, when the signal indicates a request to change to a transmission mode allowing to transmit a signal at a reduced transmission speed. This may allow to filter out disturbances with a higher frequency more easily.

Additionally or alternatively, in a control unit the receiver circuit may comprise a spike filter comprising a filter characteristic based on a changeable maximum time, wherein the receiver circuit may be configured to increase the maximum time, when the signal indicates a request to change to a transmission mode allowing to transmit a signal at a reduced transmission speed. By implementing a spike filter with a changeable maximum time, and by increasing the maximum time in response to the signal requesting to change to a transmission mode with a reduced transmission speed, it may be possible to filter out a larger number of spike-like disturbances.

Additionally or alternatively, a control unit may be configured to provide the sensor device with electrical power and to increase the electrical power provided to the sensor device, when the monitored quality of the received signal indicates a degradation of the quality of the received signal. In other words, the control unit may not only provide the sensor device with a signal indicating a change of the transmission mode, but it may also aid the sensor device by providing more electrical power, for instance in the form of an increased supply voltage and/or of an increased supply current, to improve the robustness against distortions.

Additionally or alternatively, in a control unit the receiver circuit may be configured to receive signals from a plurality of sensor devices, wherein the monitor circuit may be configured to monitor the quality of the plurality of received signals, and wherein the transmitter circuit may be configured to transmit the signal indicating the request to change the transmission mode to at least one of the sensor devices of the plurality of sensor devices, a group of sensor devices comprising at least two different sensor devices of the plurality of sensor devices, and all sensor devices of the plurality of sensor devices. Depending on the implementation and the disturbances present, the control unit may change the transmission mode of a single sensor device, of a group of sensor devices or even of all sensor devices simultaneously.

Additionally or alternatively, in a control unit the receiver circuit may be configured to receive a signal asynchronously. This may allow a simpler implementation of an architecture comprising the control unit since the control unit may not have to provide a time basis in the form of a clock signal for transmitting the data from the sensor device to the control unit.

Additionally or alternatively, in a control unit the receiver circuit may be configured to receive the signal using at least one of a pulse-width-modulation scheme, an amplitude modulation scheme, a transmission scheme based on modulating a current level of the received signal, and a transmission scheme based on modulating a voltage level of the received signal. Additionally or alternatively, in a control unit the receiver circuit may be configured to use at least one of a PSIx communication protocol, a SPC communication protocol, a SENT communication protocol, a LIN communication protocol, and a DSIx communication protocol. Here, x may once again be an integer or another version indicator, as mentioned before.

A control unit according to an additional or alternative example comprises a receiver circuit to receive a signal indicating a value of a quantity from a sensor device, and a monitor circuit to monitor a quality of the received signal, wherein the control unit is configured to provide the sensor device with electrical power and to increase the electrical power, for instance in the form of an increased supply voltage and/or of an increased supply current, provided to the sensor device, when the monitored quality of the received signal indicates a degradation of the quality of the received signal.

This may allow the control unit to assist the sensor device in providing a signal comprising the value of the quantity with more energy to counteract the influences of the disturbances by providing additional energy to the sensor device. Therefore, a control unit may allow a signal transmission of a sensor device with a higher energy per piece of information by providing additional energy to the sensor device. By providing additional energy, the influence of the distortions may be less severe and a reliability of detecting the value comprised in the signal received by the control unit may be improved.

A method, which may be performed by an integrated sensor device or a sensor device, comprises transmitting a signal indicating a value of a quantity detected by a sensing element according to a transmission mode, receiving a signal indicating a request to change the transmission mode, and changing the transmission mode based on the received signal.

A method, which may be performed by a control unit, comprises receiving a signal indicating a value of a quantity from a sensor device, monitoring a quality of the received signal and transmitting a signal indicating a request to change a transmission mode of the sensor device, when the monitored quality of the received signal indicates at least one of a degradation of the quality of the received signal, an improvement of the quality of the received signal and a constant quality of the received signal.

A method, which may be performed by a control unit, comprises providing a sensor device with electrical power, receiving a signal indicating a value of a quantity from the sensor device, monitoring a quality of the received signal and increasing the electrical power provided to the sensor device, when the monitored quality of the received signal indicates a degradation of the quality of the received signal.

The previously-mentioned processes of the methods are by far not required to be performed in the mentioned order. The different processes may be performed in a different order, unless explicitly stated otherwise. Moreover, the processes may be at least partially performed at the same time, eventually even simultaneously. For instance, they may be performed by a single action. Hence, it may be possible to perform more than just one of the processes by one or more actions. The processes may also comprise sub-processes not mentioned. Also additional processes may be implemented. The methods may comprise performing one, some or even all processes repeatedly, for instance, until a predetermined condition is fulfilled.

Any of these methods may, for instance, be implemented based on a program with a program code for performing, when running on a programmable hardware, the respective method or methods. A programmable hardware may, for instance, comprise a processor, a central processing unit (CPU), a graphical processing unit (GPU), a field programmable gate array (FPGA), an application specific integrated circuit (ASIC), a system on chip (SOC) or any other programmable hardware. For instance, the program for performing any of these methods may be implemented in the form of a firmware. It may be comprised in a program carrier such as a memory, a non-volatile memory or the like.

For instance, an integrated sensor device and a control unit as described above may be implemented together in a sensor system or sensor arrangement.

BRIEF DESCRIPTION OF THE DRAWINGS

Several embodiments of the present invention will be described in the enclosed Figures.

DETAILED DESCRIPTION

Figure 1:
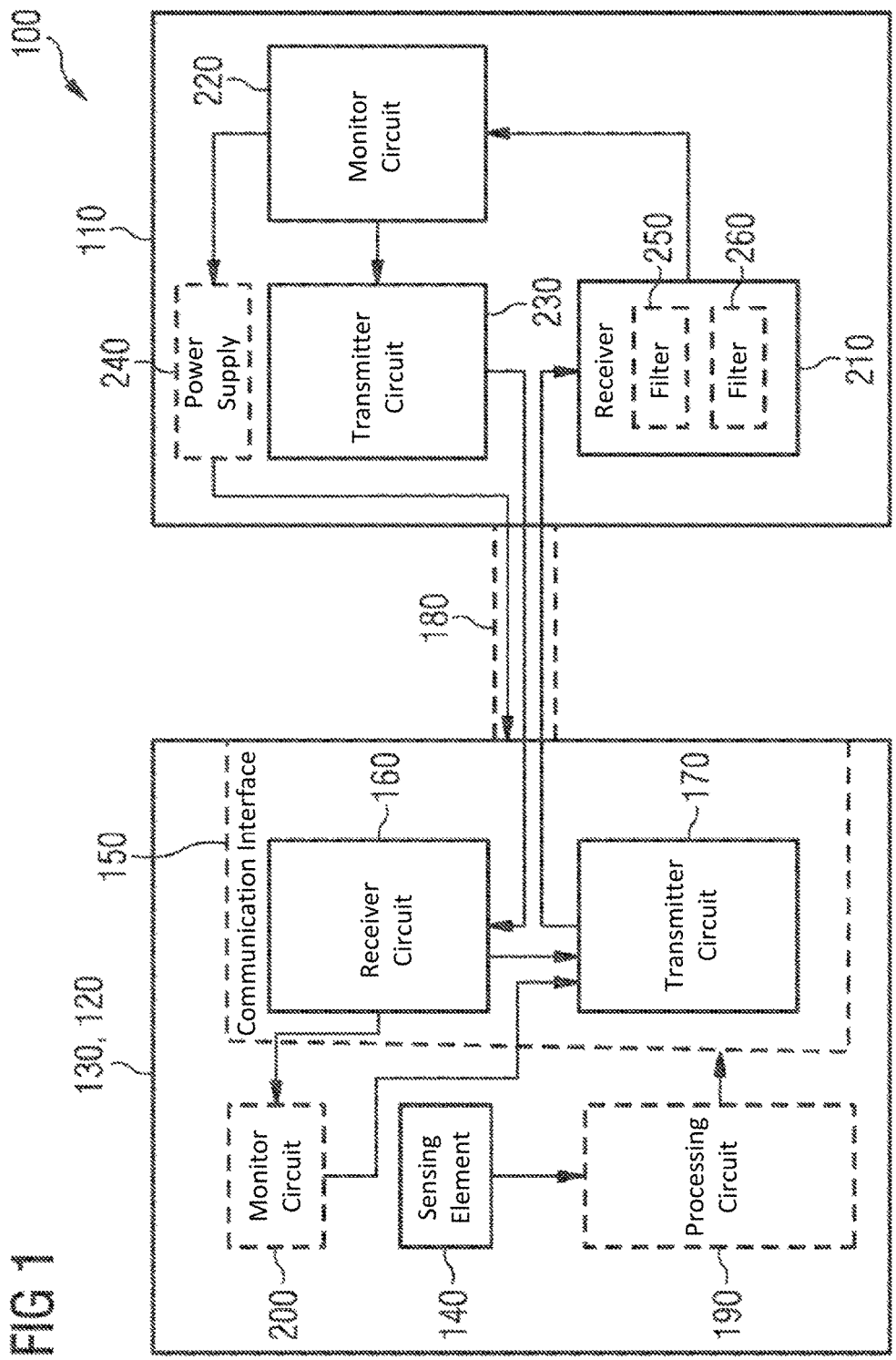
FIG. 1 shows a block diagram of a sensor system comprising an integrated sensor device and a control unit.

In the following, embodiments according to the present invention will be described in more detail. In this context, summarizing reference signs will be used to describe several objects simultaneously or to describe common features, dimensions, characteristics, or the like of these objects. The summarizing reference signs are based on their individual reference signs. Moreover, objects appearing in several embodiments or several figures, but which are identical or at least similar in terms of at least some of their functions or structural features, will be denoted with the same or similar reference signs. To avoid unnecessary repetitions, parts of the description referring to such objects also relate to the corresponding objects of the different embodiments or the different figures, unless explicitly or—taking the context of the description and the figures into account—implicitly stated otherwise. Therefore, similar or related objects may be implemented with at least some identical or similar features, dimensions, and characteristics, but may be also implemented with differing properties.

As mentioned before, in many fields of applications sensor devices, which are also referred to as sensors, are used to determine a value of a physical, chemical or other quantity. However, a location or position, where the quantity is detected, may differ from a location or position, where the respective value is collected, received, pre-processed or even processed. Therefore, it may be necessary to transmit the detected value concerning the quantity to a control unit or another unit.

To transmit such a value, different approaches, technologies and protocols may be used. For instance, it may be possible to transmit the corresponding data by encoding the value to be transmitted in an analog signal, which may be continuous in terms of both its timely resolution and the values transmittable. However, also different transmission protocols may be used allowing, for instance, the values to be transmitted digitally encoded. In such a case, the values transmitted may be quantized in both their timely resolution and their range of values. In other implementations, a transmission may also comprise any combination of these transmission schemes, for instance, using a continuous transmission in terms of the timely resolution, but a quantized transmission of the values or vice-versa.

Depending on the transmission scheme used, it may be necessary to provide each individual sensor device with one or even more wires or lines in the case of an electrical transmission scheme. This may lead to rather complex sensor systems, when the number of sensor devices rises. For instance, in high-volume architectures and/or low-cost architectures, the tendency exists to reduce the infrastructure necessary to provide a central unit such as a control unit with the data collected by one or more sensor devices. In the following, examples will be described coming from the field of automotive technology. However, examples are by far not limited to this field of technology.

In the automotive sector, different protocols may be used to allow sensor devices comprising corresponding sensor interfaces or communication interfaces to communicate with such a central unit such as a control unit. Some of these protocols may employ a communication or transmission link based on a bus system allowing to simplify wiring and connecting the sensor devices to a central unit. Examples of different sensor interfaces and protocols comprise, for instance, a SENT (Single Edge Nibble Transmission) protocol, a SPC (Short PWM Code; PWM=Pulse Width Modulation) protocol, a LIN (Local Interconnect Network) protocol, a PSIx (Peripheral Sensor Interface, version x) protocol such as the PSI5 protocol, and the DSI (Digital Serial Interface) protocol, to name a few possible protocols and transmission techniques.

Sensor interfaces like the previously-mentioned are often designed around a trade-off between a data rate and transmission quality. They are often used in environments, such as an automotive environment of a motorized or non-motorized vehicle, which may disturb the transmission due to electromagnetic coupling (EMC) in the case of electrical sensor interfaces. Often, the specifications of these interfaces are designed to work properly for the case that the electromagnetic coupling stays in an expected range for normal or specified car operations. However, for exceptional situations, when, for instance, another system of a vehicle is disturbed, these specifications may be exceeded leading to a disturbed transmission of the signals transmitted by these communication interfaces. In these interfaces, a mechanism for a graceful degradation is typically not implemented and missing.

Transmission protocols used for transmitting data from or to a sensor device to a central unit such as a control unit typically operate under partially very contradicting design goals. On the one hand, the transmission protocols are supposed to transmit data as efficiently as possible leading to a high data throughput so that a single sensor device or a small number of sensor devices is capable of transmitting detected quantities at a very high rate. It may also be possible to couple a larger number of sensor devices to such a communication link allowing to share the bandwidth offered by the communication protocol and the corresponding communication link between the sensor devices and still enabling a sufficiently high data throughput for each of the sensor devices to provide the central unit with the amount of data to fulfill its task.

However, depending on the application, such a communication link may face a great number of distortions including, for instance, disturbances caused by other components, environmental factors or the like. For instance, in the case of a wire-based transmission scheme, disturbances may couple into the communication link capacitively and/or inductively. For instance, in the case of an engine control system employing a pulse width modulation scheme to control a component, high frequency spikes may capacitively couple into the communication link. Furthermore, the quality of the connection may be influenced by the quality of the contacts inside plugs. The situation may be aggravated by environmental factors including, for instance, moisture, greatly varying temperatures, mechanical vibrations and shocks to name some examples.

To cope with these disturbances, the communication or transmission link may provide physical components including, for instance, a shielding, but also logical safeguards, which may be implemented as part of the underlying protocol.

However, all these measures may lead to more complex implementations and more complex infrastructures necessary to transmit data from the sensor devices to the central unit. For instance, in high volume architectures and/or low-cost applications, these measures may not be feasible.

Therefore, the challenge exists to improve a trade-off between transmission speed or a high data throughput, robust operations even under adverse conditions, a simple implementation, and energy consumption. Depending on the number of sensor devices, reducing the number of consumed anticipated energy may be another aspect to reduce an overall energy consumption of a sensor system including the system comprising it.

FIG. 1 shows a block diagram of a sensor system 100 comprising a control unit 110 and a sensor device 120, which may be implemented as an integrated sensor device 130. In the following, the sensor device 120 will be described as an integrated sensor device 130. However, this is by far not necessary.

The integrated sensor device 130 comprises a sensing element 140, which is also referred to as a sensor element and which is configured to detect a value of a physical, a chemical or another quantity. The sensing element 140 is coupled to a communication interface 150 to provide the communication interface 150 with a signal indicating the value. For instance, the sensing element may be a magnetic field sensing element, which may be sensitive to a magnetic field strength, an orientation or the like of a magnetic field acting on the sensing element 140 or any of the spatial components of the magnetic field. However, the sensing element 140 may also be a sensing element sensitive to an optical quantity such as an intensity, a wavelength or a frequency of radiation interacting with a sensing element 140, an electrical sensing element sensitive to an electric field strength, a current or the like, or a sensing element sensitive to a temperature, humidity or another physical or chemical quantity. For instance, the sensing element may comprise a resistor, a semiconductor junction or another structure sensitive to a change of an environmental property, to which the respective structure responds, for instance, with a change of its resistance.

The communication interface may be designed and configured to communication with an external control device, which may be implemented in the sensor system 100 depicted in FIG. 1 as the control unit 110. The communication interface 150 comprises a receiver circuit 160, which is configured to receive a signal indicating a request to change a transmission mode. The communication interface 150 further comprises a transmitter circuit 170 configured to change the transmission mode based on the received signal. To facilitate this, in the example depicted in FIG. 1, the receiver circuit 160 and the transmitter circuit 170 are coupled to one another.

It should be noted that although in the example depicted in FIG. 1, the receiver circuit 160 and the transmitter circuit 170 are depicted as individual circuits, the transmitter circuit and the receiver circuit may share one or more electrical components. Moreover, the receiver circuit 160 and the transmitter circuit 170 may be implemented as a transceiver circuit capable of and configured to do both, receiving and transmitting signals. Examples comprising transceiver circuits will be described in more detail in context with FIG. 3 and FIG. 4.

The transmitter circuit 170 may, for instance, transmit the signal indicating the value detected by the sensing element 140 using an asynchronous transmission scheme. This may allow an easier implementation of the sensor system 100 since providing a common clock signal or a common time basis for the sensor system 100 may be avoidable. Depending on the transmission protocol and the transmission technique used, the communication interface 150 may use for transmitting and/or receiving corresponding signals by the transmitter circuit 170 or the receiver circuit 160, respectively, any transmission scheme including, for instance, a pulse width modulation scheme (PWM scheme) and/or an amplitude modulation scheme. In the case of an amplitude modulation scheme, the signal to be encoded may be encoded in at least two different signal levels. In the case of an electrical communication system, the transmission scheme may be based on modulating a current level and/or on modulating a voltage level of the signal to be transmitted.

For instance, a SENT- or SPC-based transmission scheme may be a voltage-modulated, pulse-width-modulation scheme. For instance, in the case of a LIN-based transmission scheme, the information is included in an amplitude of a voltage. Similarly, in a DSIx-based transmission scheme, the information to be transmitted may also be encoded in a current-level. In the case of a PSIx-based transmission scheme, the information may be encoded in a current level used. Here, a Manchester-coding scheme may be used to transmit the data.

The transmitter circuit 170 is configured to operate in more than just one transmission mode. To be more precise, the transmitter circuit 170 can operate in a plurality of transmission modes comprising a default transmission mode, which may offer the highest data rate, and at least one further transmission mode, which allows transmitting a signal with a higher robustness against distortions compared to the default transmission mode. The default transmission mode may be chosen, for instance, after a power-up of the integrated sensor device 130, an initialization of the integrated sensor device 130 or in the absence of a previous signal indicating a request to change the transmission mode. However, the integrated sensor device 130 may operate also in another, predetermined mode of operation after the power-up of the integrated sensor device 130, the initialization of the integrated sensor device 130 or in the absence of a previous signal indicating a request to change the transmission mode. The default mode of operation may be one possibility for the predetermined transmission mode used under the circumstances mentioned above.

For instance, the predetermined mode of operation may be a transmission mode offering a higher robustness against distortions than the default transmission mode. This may allow to prevent the first communication at startup from failing even if heavy distortion exists at that moment. In other words, it may assure that the communication at the startup can be established even under difficult conditions. It may further allow coming back to a more robust setup by a power-on reset, when, for instance, an attempt to increase the data rate fails.

To increase the robustness of the signal transmitted by the transmitter circuit 170 against distortions, an energy amount transmitted per piece of information or datum may be increased compared to the default transmission mode. A piece of information may be a single bit, a nibble (4 bits), a byte (8 bits), or any other datum. For instance, the at least one further transmission mode may comprise transmitting a signal with a reduced transmission speed compared to the default transmission mode. Due to the reduced transmission speed, the time per piece of information transmitted via the signal is increased such that an integral of the energy per unit time x the duration for transmitting the piece of information is higher than in the default mode of transmission.

Similarly, a larger amplitude may be used for transmitting the signal, which may also increase the energy per piece of information transmitted. Similar to reducing the transmission speed, a message comprising the value of the quantity detected by the sensing element 140 may be repeated which leads also to a larger amount of time during which the piece of information is transmitted.

An error detection code or an improved error detection code allowing detecting or even correction of an error in the signal transmitted may also be used, which introduces redundancy into the signal or additional redundancy into the signal such that the amount of energy used for transmitting a single piece of information is at least on average also increased. For instance, as error detecting codes, parity bits, check sums, hamming codes or cyclic redundancy checks (CRC) of different lengths may be used. An error detection code may also comprise using an error correction code capable of at least correcting some, for instance, 1-bit errors.

Compared to the default transmission mode, the at least one further transmission mode may use one or more previously-mentioned measures to increase the energy amount transmitted during the transmission of a single piece of information. In other words, not only the previously-mentioned measures may be implemented, but also any combination thereof in the specific further transmission mode offering a higher robustness against distortions.

Instead of just implementing two transmission modes, namely the default transmission mode and a single further transmission mode offering a higher robustness against distortions, the transmitter circuit 170 may be configured to be operating in more than just one further transmission mode. For instance, any transmission mode of a plurality of further transmission modes may be chosen by the control unit 110 by transmitting the corresponding request to the integrated sensor device 130.

As outlined before, the sensing element 140 is coupled to the communication interface 150 to provide the communication interface 150 indicating the value of the quality detected by the sensing element 140. The transmitter circuit 170 of the communication interface 150 may be capable of transmitting the value via a transmission link 180 to the control unit 110 or a similar external device. The transmission line 180 may comprise an electrical connection, coupling each individual sensor device 120 to the control unit 110. However, the transmission link 180 may also be implemented as a bus or a similar electrical communication link capable of coupling more than just one sensor device 120 to a corresponding control unit 110 or a similar external device. Apart from electrical connections, the transmission link 180 may also be implemented as an optical transmission link, a magnetic transmission link or the like.

Depending on the transmission technology used by the transmitter circuit 170 and the transmission link 180, the transmitter circuit 170 may be configured to generate a signal using the respective encoding to transmit the value detected by the sensing element 140. The transmission link 180 may be used to transmit the signals from the integrated sensor 130 to the control unit 110. It may further be used to also transmit the signal indicating, for instance, the request to change the transmission mode from the control unit 110 to the integrated sensor device 130.

As an optional implementation, the integrated sensor device 130 may comprise a processing circuit 190 coupled in between the sensing element 140 and the communication interface 150 to process the detected value of the quantity and to provide the processed value of a quantity to the communication interface 150. In this case, the transmitter circuit 170 or the communication interface 150 is configured to generate the corresponding signal indicating the processed value. For instance, the processed value may comprise an average value of several values detected by the sensing element 140 to name an example. However, also other signal manipulations including, for instance, a pre-discretizing of the respective value may be used. For instance, the processing circuit 190 may be used to evaluate as to whether the value detected by the sensing element 140 is larger or smaller than an adjustable, programmable, fixed or otherwise predetermined threshold value. For instance, the processing circuit 190 may comprise a comparator. The processing circuit 190 may also be used to apply calibration data to the value concerning the quantity detected by the sensing element 140.

The integrated sensor device 130 may further comprise a monitor circuit 200, which is coupled to the receiver circuit 160 and capable and configured to monitor a quality of a power supply signal. Based on an assessment by the monitor circuit 200, it may further change the transmission mode of the transmitter circuit 170 to a transmission mode comprising a higher robustness against distortions or—if possible— to a transmission mode comprising a higher robustness against distortions, when the quality of the received signal indicates a degradation of the received signal, a constant quality or even an improving quality of the received signals.

Such a distortion monitor on the sensor side may watch a physical change of the signal by monitoring, for instance, voltage peaks or current peaks, measuring an out of band energy or check a variance of incoming voltage levels and current levels during one or more idle windows of the communication protocol. It may even perform FFT (Fast Fourier Transformation) analysis of the spectrum of the physical supply signal in idle periods between the transmissions. Further, the monitoring of an intentional increase of the supply voltage by the control unit 110 based on its channel monitoring may be detected and may lead to additional actions of the sensor such as increasing the modulation current on top of the higher supply.

However, the monitor circuit 200 may also be configured to monitor a quality of the received signal, for instance, by a statistical analysis. By implementing the monitor circuit 200 in this way, the integrated sensor device 130 may additionally verify as to whether the quality of the signals received points to the possibility of a degradation of the signal quality and, hence, to an onset of distortions in the transmission link 180. Even if these distortions go unnoticed by the controller unit 110, the integrated sensor device 130 may be capable of detecting such an onset of distortions and to take appropriate actions by the monitor circuit 200. For instance, when the modulation principle for upstream communication and downstream communication is different as, for instance, in the case of DSI3 with a 3 level current amplitude modulation from the sensor to ECU and a supply voltage Manchester-modulation or BPSK modulation from the ECU to the sensor. In this case different coupling effects may disturb one but not the other channel. Furthermore, this may also be possible, when both directions operate at different frequencies and are thus sensitive to different distortion spectra as well. The monitor circuit 200 may use a statistical analysis to determine the quality of the received signal. This may allow the monitor circuit 200 to disregard isolated single events of a distortion and to change the transmission load only in case a severe or noticeable degradation in the transmission link 180 is noticeable. As outlined before, the further transmission modes may allow an increase of the energy amount to be transmitted per single piece of information. Depending on the implementation of the transmission mode, it may be possible to support this transmission mode by providing additional electrical energy. For instance, the integrated sensor device 130 may be coupled to a power supply. The integrated sensor device 130 may then be configured to increase an amplitude of the transmitted signal in response to a high electrical power provided by the power supply. The integrated sensor device 130 may, however, react without increasing the signal amplitude of the signal generated by the integrated sensor device 130. For instance, it may be possible that an increase of the supply of a rail-to-rail output driver increase the headroom for the supply voltage regulator of the sensor to improve its power supply rejection ratio (PSRR). This may help to counteract distortions caused, for instance, by an electromagnetic coupling (EMC) into the supply line. It may also directly increase the transmitted signal energy—for instance for a digital 3-wire voltage interface like SENT or SPC. This may be an application, where the sensor device may remain unchanged. It may, therefore, be interesting for systems comprising conventional sensor devices.

The transmission link 180 may also be used to provide the electrical energy to the integrated sensor device 130. However, in other examples, the electrical energy may be provided via a different electrical connection.

The control unit 110 comprises a receiver circuit 210 to receive a signal from the integrated sensor device 130 shown in FIG. 1 indicating a value sensed by the integrated sensor device 130. It further comprises a monitor circuit 220, which is coupled to the receiver circuit 210 and configured to monitor a transmission quality of the received signal. The control unit 110 further comprises a transmitter circuit 230 to transmit a signal indicating a request to change a transmission mode, when the monitored transmission quality of the received signal indicates a degradation of the received signal, an improvement of the quality of the received signal and/or a constant quality of the received signal, for instance, over a fixed, programmable or changeable period of time. To receive an appropriate indication, the monitor circuit 220 is coupled to the transmitter circuit 230.

As outlined before in the context of the monitor circuit 200 of the integrated sensor device 130, also the monitor circuit 220 may monitor the quality of the received signal based on a statistical analysis. For instance, the monitor circuit 220 may monitor the quality of the signal based on a verification of an error detecting code, monitoring timing variations of the received signal, monitoring a message counter comprised in the received signal and/or detecting an expected but missing message or a part thereof. In principle, the monitor circuit 220 and the monitor circuit 200 of the control unit 110 and of the integrated sensor device 130, respectively, may use identical algorithms and schemes to determine the quality of the received signals.

The transmitter circuit 230 may send a corresponding signal comprising a request to change the transmission mode to the integrated sensor device 130 having a higher robustness, when the monitor circuit 220 indicates the previously-mentioned degradation of the quality of the received signals. As outlined before, depending on the capabilities of the control unit 110 and the integrated sensor devices 130 or sensor devices 120 coupled to the control unit 110, the control unit 110 may choose any transmission mode suitable for the present distortions and supported by the respective sensor device 120, 130.

When the monitor circuit 220 detects that the quality of the received signal remains constant and a transmission mode with a higher robustness against distortions is currently used by the corresponding integrated sensor device 130, or when the monitor circuit 220 detects an improvement of the quality of the received signals, while the corresponding integrated sensor device 130 still uses a transmission scheme with a higher robustness against distortions, the control unit 110 may cause the transmitter circuit 230 to transmit a signal comprising a request to change back to the default transmission mode, which may allow a higher signal transmission speed and/or a lower energy consumption. In other words, when the level of distortions is reduced, the control unit 110 may allow the integrated sensor device 130 to switch back to a more relaxed transmission mode. Instead of immediately switching back to the default transmission mode, the transmitter circuit 230 may generate a corresponding signal including a request to switch to another transmission mode with a lower robustness against distortions, but still a higher robustness against distortions compared to the default transmission mode.

The transmitter circuit 230 of the control unit 110 and the transmitter circuit 170 of the integrated sensor device 130 may in principle be identical. However, they may also differ in terms of some implementation details. The same is also true for the receiver circuit 210 of the control unit 110 and the corresponding receiver circuit 160 of the integrated sensor device 130. Accordingly, also the receiver circuit 210 and/or the transmitter circuit 230 of the control unit 110 may optionally operate in an asynchronous transmission scheme, use a pulse-width-modulation scheme, an amplitude modulation scheme, a transmission scheme based on modulating a current level and/or based on modulating a voltage level. In other words, the control unit 110 and the integrated sensor device 130 may use the same communication protocol mentioned before.

To provide the integrated sensor device 130 with the electrical power, the control unit 110 may comprise a power supply 240 or power supply circuit coupled, for instance, via the transmission link 180, with the integrated sensor device 130 to provide the integrated sensor device 130 with electrical power. When the monitor circuit 220 detects a degradation of the quality of the received signal, the monitor circuit 220 may provide the power supply 240 with an appropriate control signal to provide the integrated sensor device 130 with a higher electrical power. In other words, when the monitor circuit 220 detects a degradation of the quality of the received signal, the power supply 240 or the control unit 110 may provide the integrated sensor device 130 with an increased electrical power.

The receiver circuit 210 may further comprise an input filter 250 which in turn comprises a filter characteristic based on a changeable corner frequency. The receiver circuit 210 may be capable of decreasing the corner frequency, when the signal transmitted by the transmitter circuit 230 indicates a request to change to a transmission mode having a reduced transmission speed of the signal to be received. Similarly, the receiver circuit 210 may further comprise a spike filter 260 comprising a filter characteristic based on a changeable maximum time. The receiver circuit 210 may increase the maximum time, when the signal indicates a request to change the transmission mode of the integrated sensor device 130 to transmit a signal with a reduced transmission speed. A spike filter may, for instance, comprise a delay element and an adder or a gate to add or overlay, respectively, the original signal and the delayed signal. Due to the superposition of the delayed signal and the original signal, it may be possible to reduce spikes caused by a capacitive coupling into the transmission link 180 or directly into the integrated sensor device 130 or the control unit 110. As a consequence, spikes may be reduced. The maximum time used in the framework of the spike filter may be the delay time used by the delay element. For instance, the delay line may be implemented as a chain of flip-flops, the delay time or—in other words—the maximum transmission time may be adjusted by tapping the delayed signal at different positions along the delay line.

Although an input filter 250 and a corresponding spike filter 260 are not shown as parts of the receiver circuit 160 of the integrated sensor device 130, also the receiver circuit 160 may comprise similar components as indicated earlier.

Although in FIG. 1 the sensor system 100 has been mainly described with respect to an integrated sensor device 130, also other sensor devices 120 may be used. For instance, a control unit 110 may be coupled to a more general sensor device 120.

The integrated sensor device 130 may be implemented on one or more dies such as semiconducting dies. Depending on the implementation, the single die or more dies may be packaged into a common package multiple onto a printed circuit board. For instance, such a package may comprise a predetermined number of terminals allowing the package to be electrically and optionally mechanically coupled to a printed circuit board or a similar carrier. For instance, as mentioned before, the integrated sensor device 130 may have undergone a calibration process, the calibration data of which may be stored as part of the processing circuit 190. Instead of one or more semiconducting dies, also insulating dies or similar substrates may be used. A die typically comprises a thickness along one direction in space, which is substantially smaller than an extension along two linear independent directions, which may together with the direction along which the thickness is taken form a basis for a 3-dimensional coordinate system. Depending on the die or substrate material used, the three directions may be oriented along crystallographic axes. They may also follow orthogonal directions of a Cartesian coordinate system.

Multiple sensors may be connected to a single transceiver and the measured values are transmitted via the same channel. In this case it may be an additional degradation option to leave out information of the least important sensor, for instance a die temperature measurement, and use the transmission capacity for data of the more important sensors, for instance, to transmit manifold air pressure and/or throttle valve position data.

In such a sensor system 100, an error statistic may be evaluated on the receiver side or, in other words, on the side of the controller unit 110. In the case that a reception quality criterion is undercut, the control unit 110 may send a command to the integrated sensor device 130 to reduce a transmission data rate or to modify the transmission mode, which is also referred to as the channel encoding. To facilitate this, the integrated sensor device 130 may have to be able to receive messages from the control unit 110, which may also be referred to as electronic control unit (ECU). Suitable communication modes may comprise, for instance, communication protocols like SPC, PSI5, LIN or DSI3 to name some examples. The integrated sensor device 130 may be able to adapt its transmission to at least one degradation level on request of the controlled unit 110. Possible degradations comprise, for instance, reducing the transmission speed in order to increase the signal energy per transmitted bit. The modulation level may also be increased. For instance, in the case of a PSIx transmission scheme, the transmitter circuit 170 of the integrated sensor device 130 may be switched from a low power mode to a regular mode. Also, an enhanced redundancy may be added, for instance, using an 8-bit or a 16-bit cyclic redundancy check value (CRC value) instead or on top of the standard CRC or parity defined in the protocol standard. Moreover, each message may be repeated. Naturally, any combination may also be used.

The control unit 110 receives the messages sent by the integrated sensor device 130 and applies at least one check mechanism to prove the correctness of the reception. This can be performed by the monitor circuit 220. Possible prove mechanisms are a cyclic redundancy check or a parity as defined, for instance, in the corresponding standard protocol, timing verifications according to the protocol such as the Manchester timing in the case of a PSI5 protocol, the correctness of a message counter and a detection of lost frames such as missing messages, which are expected in a PSI5 synchronization frame to name an example.

Furthermore the monitor circuit may use measurements of electrical parameters of the incoming signals, for instance the sensor bus supply voltage, the sensor bus supply current or voltage or current on a further, additional communication wire, and analyze it in order to detect indications for electrical distortions by counting voltage peaks or current pulses, by measuring electrical energy outside the communication band, or by comparing the (FFT-) spectra of the signals with expected spectral patterns.

Depending on the error, the control unit 110 may generate a transmission error statistic and decide if a protocol degradation is required. In case of different degradation choices, an appropriate measure can be assigned to different types of errors. For instance, in the case of an increased number of detected timing violations, the protocol timing may be extended. In case of an increased number of CRC violations, an extension of the protocol timing and/or an increase of the CRC protection may be implemented. In the case of a loss of frames, a repeated transmission may be initiated.

On top of these measures, which may be initiated by the control unit 110 on the sensor side, it may implement one or more options on its own side directly. For instance, the sensor supply voltage may be increased from the control unit 110. As a consequence, the sensor may increase the modulation current levels in order to increase a signal energy. Furthermore, the corner frequency of input filters 250 may be decreased according to selected data rate reductions on the sensor side. Moreover, it may be possible to increase the maximum time of removed spikes according to relaxed protocol timing. Moreover, the sensor may also take measures that make the measurement more robust against distortion like increasing a hall plate bias current or decrease the corner frequency of internal filters inside the signal path.

Figure 2:
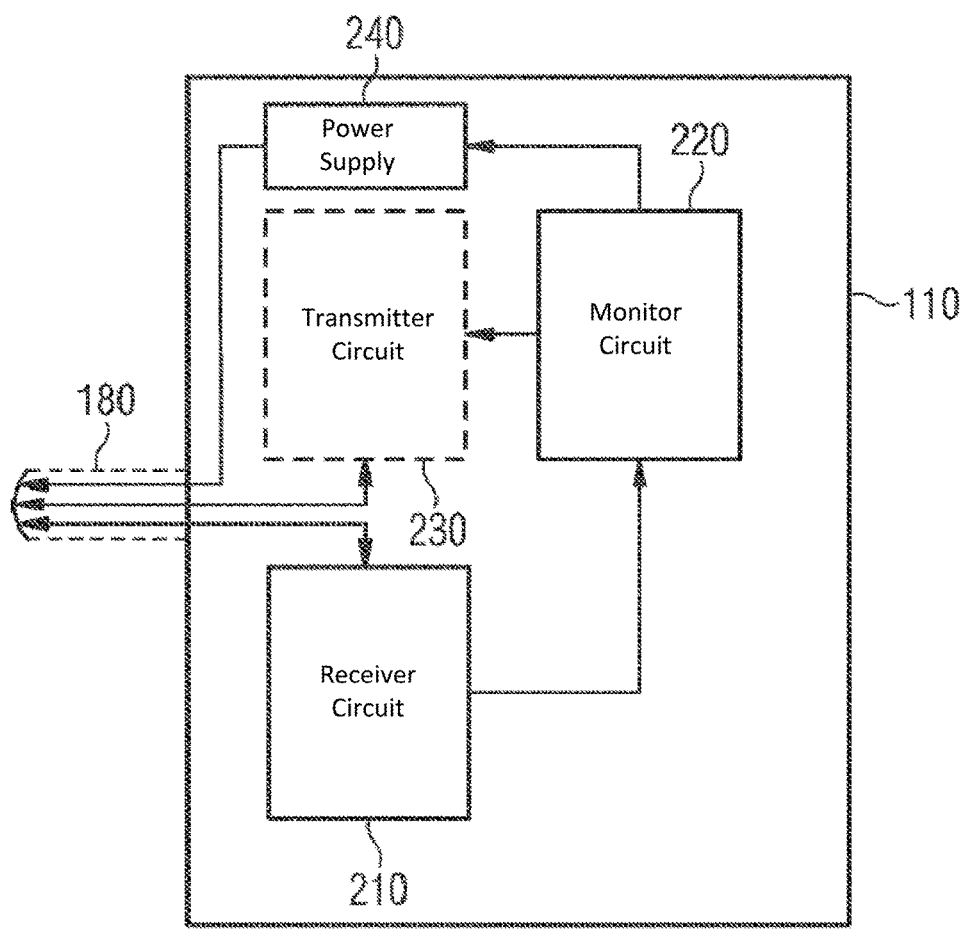
FIG. 2 shows a block diagram of another control unit.

FIG. 2 shows a further example of a control unit 110, which is similar to the control unit 110 as depicted in FIG. 1. Also here, the control unit comprises a receiver 210 to receive the signal indicating a value of a quantity from a sensor device, a monitor circuit and a monitor circuit 220 to monitor a quality of a received signal. The control unit 110 further comprises a power supply 240 coupled to the monitor circuit 220 to provide the sensor device, which is not shown in FIG. 2 with electrical power and to increase the electrical power provided to the sensor device, when the monitored quality of the signal indicates a degradation of the quality of the received signal. Optionally, the control unit 110 may also comprise a transmitter circuit 230 to allow communicating with the sensor device or other components via the transmission link 180.

Figure 3:
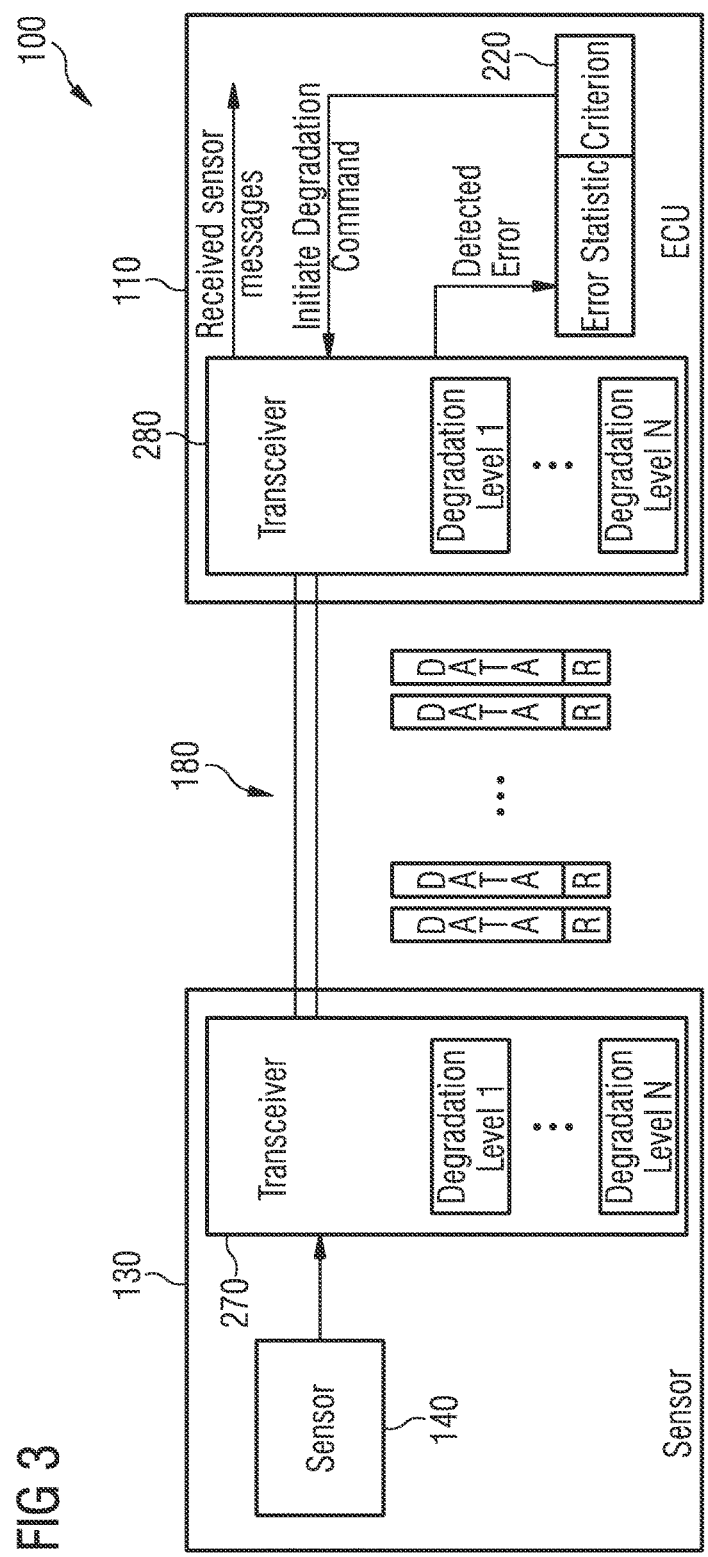
FIG. 3 shows a block diagram of another sensor system.

FIG. 3 shows a block diagram of another sensor system 100 comprising a control unit 110 and one integrated sensor device 130 which is also referred to as sensor in FIG. 3. Once again, the integrated sensor device 130 comprises a sensing element 140, which is coupled to a transceiver 270, which comprises the previously-mentioned transmitter circuit 170 and the receiver circuit 160. Both, the receiver circuit 160 and the transmitter circuit 170 of the integrated sensor device 130 are not shown in FIG. 3.

The transceiver 270 of the integrated sensor device is capable of operating in several transmission modes depending on the quality of the transmission. In FIG. 3, the different transmission modes are referred to as degradation level 1 to degradation level N. Depending on the quality of the signals received by the control unit 110 (ECU), which the control unit 110 receives via the transmission link 180, the control unit 110 can instruct and command the transceiver 270 of the integrated sensor device 130 to use instead of the default transmission mode any of the degradation levels.

The control unit 110 also comprises a transceiver 280, comprising the receiver circuit 210 and the transmitter circuit 230, which are both not shown in FIG. 3. Also the transceiver 280 of the control unit 110 is capable of being operated in the default mode of transmission as well as the previously-mentioned degradation levels. The control unit 110 further comprises the monitor circuit 220, which is coupled to the transceiver 280 to determine an error statistic and to compare the error statistic with a criterion. When the criterion is fulfilled, the monitor circuit 220 initiates the degradation of the transmission by an appropriate command to the transceiver 280.

The received values or messages from the integrated sensor device 130 comprised in the data transmitted via the transmission link 180 may further be processed by the control unit 110 or another component coupled to the control unit 110.

Figure 4:
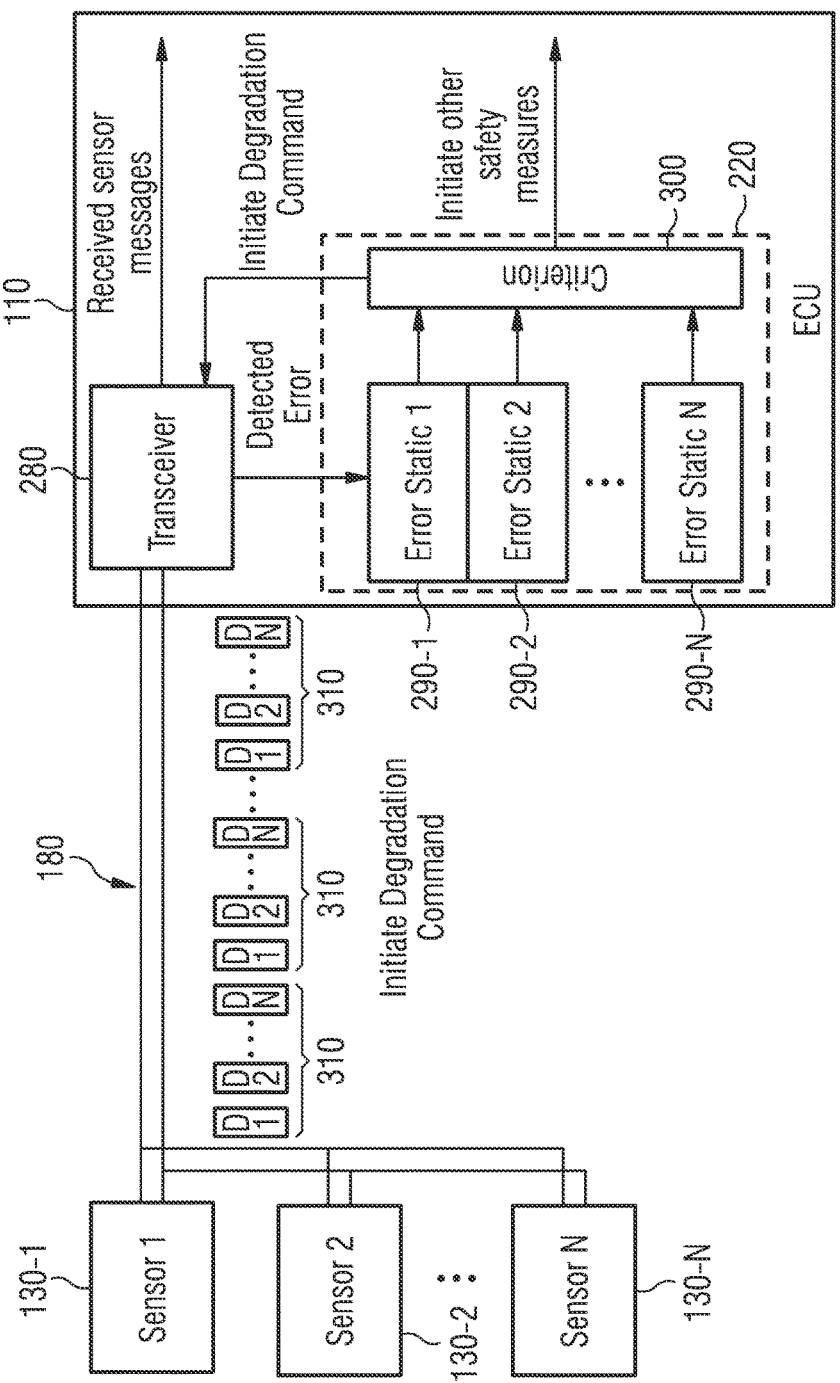
FIG. 4 shows a block diagram of a sensor system comprising a plurality of sensor devices.

FIG. 4 shows a schematic block diagram of a further sensor system 100 comprising a plurality of integrated sensor devices 130-1, 130-2, . . . , 130-N. The integrated sensor devices 130 are coupled via a transmission link 180, which may be a bus to the control unit 110 (ECU). The control unit 110 once again comprises a receiver 280 and the monitor circuit 220, which comprises, for each of the integrated sensor devices 130, an error statistic unit 290-1, 290-2, . . . , 290-N. The error statistic units 290 are coupled to an evaluation unit 300 of the monitor circuit 220, which verifies if a criterion to initiate a degradation is fulfilled. If this is the case, the evaluation circuit 300 of the monitor circuit 220 initiates a degradation command and provides the same to the transceiver 280, which in turn transmits the signal indicating a request to change the transmission mode accordingly. Based on the implementation, which may include different criterions for different scenarios, a single integrated sensor device 130 of the plurality of integrated sensor devices 130, a group of integrated sensor devices 130 comprising at least two different integrated sensor devices 130 or all integrated sensor devices 130 may be the addressee of the corresponding request to change the transmission mode. In case of sensor buses, the evaluation of the error statistics can, in other words, be done individually for each integrated sensor device 130. The integrated sensor devices 130 can be selectively or globally switched to one of the degraded protocols by switching to the corresponding transmission mode. For instance, if sufficient redundancy in the sensor network is present, it might even be possible to deactivate a specific sensor, which has been identified to deliver erroneous data to avoid further distortions instead of degrading its protocol.

FIG. 4 further indicates a transmission sequence of data transmitted by the individual integrated sensor devices 130. For instance, the sensor devices 130 may transmit their data according to an address or number. For instance, the data transmitted by the integrated sensor devices 130 may be transmitted in groups 310. Each group 310 comprises a sequence of individual data of each of the integrated sensor devices 130 according to their number. For instance, each group 310 may comprise a first data package of the sensor 130-1, followed by a message or signal by the second integrated sensor device 130-2 and so on until the N-th integrated sensor device 130-N transmits its signal forming the final member of the group 310. Afterwards, a second group 310 of data may be transmitted.

In other examples, an order of data or signal transmitted by the individual integrated sensor devices 130 may be different from the one shown in FIG. 4. Moreover, it is by far not necessary for all integrated sensor devices 130 to transmit in each of the groups a corresponding signal. For instance, one integrated sensor device 130, a group of integrated sensor devices 130 or even all of the integrated sensor devices 130 may be configured to transmit data only on a specific request transmitted, for instance, by the control unit 110. In case of such sensor systems, an additional degradation mode could be a limitation of the bus participants to the ones that are necessary for a kind of limp home operation of the overall system. For instance in the case of a motor control system this could be a reduction of the generated horsepower or in case o a steering assist system a reduction of the steering assist forces.

These and similar safety features and protocol requirements may, for instance, be specified to be available to a sensor interface such as a SPC-based sensor interface providing a command option to change a transmission rate or transmission mode.

Figure 5:
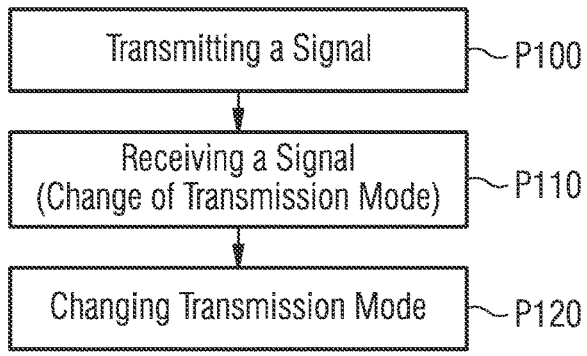
FIG. 5 shows a flowchart of a method, which may, for instance, be performed by a sensor device.

FIG. 5 shows a flowchart of a method comprising, in a process P100, transmitting a signal indicating a value of a quantity detected by a sensing element 140 according to a transmission mode. In a process P110, a signal indicating the request to change the transmission mode may be received. In a process P120, the transmission mode may be changed based on the received signal.

As was outlined before, the order of processes depicted in FIG. 5 is by far not mandatory. It merely represents an example. The processes may, for instance, be performed in a timely overlapping manner, at least partially simultaneously. Moreover, the processes described may be performed in a loop until, for instance, a changeable, predetermined, fixed or other condition is fulfilled.

The method as depicted, for instance, in FIG. 5, may be performed by an integrated sensor device 130. It may also be implemented as a program comprising a program code for performing the method in case of a software-related implementation. In this case, the integrated sensor device may, for instance, comprise a programmable hardware component and the program may be implemented as a firmware of the integrated sensor device 130.

Figure 6:
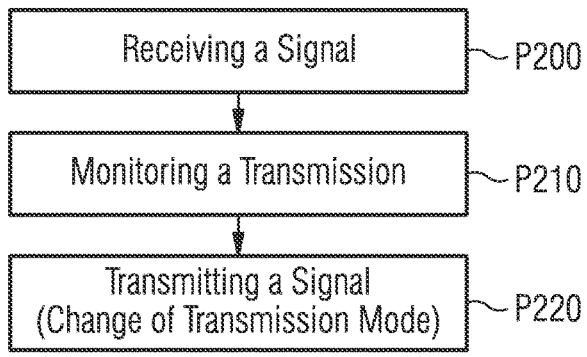
FIG. 6 shows a flowchart of a method, which may be, for instance, performed by a control unit.

FIG. 6 shows a flowchart of a method comprising, in a process P200, receiving a signal indicating a value of a quantity from a sensor device 130. It further comprises in a process P210 monitoring a transmission quality of the received signal and, in a process P220, transmitting a signal indicating a request to change a transmission mode of the sensor device 130, when the monitored quality of the signal indicates at least one of a degradation of the quality of the received signal, an improvement of the quality of the received signal and a constant quality of the received signal.

As described before, the order of processes depicted in FIG. 6 is by far not mandatory, but merely an example. Also in this case, the individual processes may be performed simultaneously, timely overlapping and/or based on a loop as described before. However, in contrast to the method depicted in FIG. 5, the method of FIG. 6 is a method, which may be performed by the control unit 110. For instance, it may be implemented as a program performed by the control unit 110 in the case the control unit 110 comprises a programmable hardware component. In this case, the program may, for instance, be a firmware.

Figure 7:
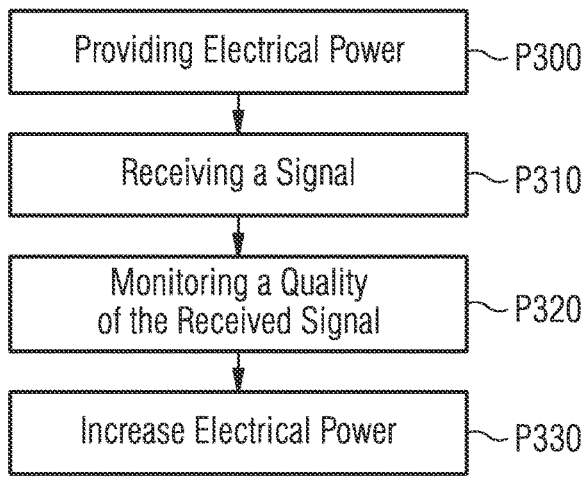
FIG. 7 shows a flowchart of another method, which may, for instance, be performed by a control unit.

FIG. 7 shows a flowchart of a further method which may, for instance, be performed by a control unit 110. Similarly, the method may, for instance, be implemented as a program, which can be performed by a programmable hardware of the control unit 110. In this case, the program may be part of the firmware of the control unit 110.

In a process P300, a sensor device 130 is provided with electrical power. In a process P310, a signal indicating a value of a quantity is received from the sensor device 130. In a process P320, a quality of the received signal is monitored. In a process P330, the electrical power provided to the sensor device 130 may be increased, when the monitored quality of the received signal indicates a degradation of the quality of the received signal.

By using an embodiment, it may be possible to improve a trade-off between a robustness of a system comprising a sensor even under adverse operational conditions, simplifying such an implementation or architecture, its energy consumption and a bandwidth of its infrastructure.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods described herein may be implemented as software, for instance, as a computer program. The sub-processes may be performed by such a program by, for instance, writing into a memory location. Similarly, reading or receiving data may be performed by reading from the same or another memory location. A memory location may be a register or another memory of an appropriate hardware. The functions of the various elements shown in the Figures, including any functional blocks labeled as "means", "means for forming", "means for determining" etc., may be provided through the use of dedicated hardware, such as "a former", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective processes of these methods.

Further, it is to be understood that the disclosure of multiple processes or functions disclosed in the specification or claims may not be construed as to be within the specific order. Therefore, the disclosure of multiple processes or functions will not limit these to a particular order unless such processes or functions are not interchangeable for technical reasons.

Furthermore, in some embodiments a single process may include or may be broken into multiple sub-processes. Such sub-processes may be included and part of the disclosure of this single process unless explicitly excluded.

What is claimed is:

1. An integrated sensor device comprising:
a sensing element; and
a communication interface configured to be coupled to the sensing element and to communicate with an external control device, the communication interface comprising a receiver circuit configured to receive, from the external control device, a signal indicating a request to change a transmission mode, and a transmitter circuit configured to change the transmission mode based on the received signal, wherein:
the communication interface is configured to transmit, to the external device via the transmitter circuit, using at least a pulse-width-modulation scheme,
the integrated sensor device is configured to be coupled to a power supply, and
the integrated sensor device is configured to perform at least one of increase an amplitude of a signal transmitted by the transmitter circuit in response to a higher electrical power provided by the power supply and improve power supply rejection ratio of the integrated sensor device in response to a higher electrical power provided by the power supply.

2. The integrated sensor device according to claim 1, wherein the transmitter circuit is configured to transmit a signal in one of a plurality of transmission modes, the plurality of transmission modes comprising a default transmission mode and at least one further transmission mode allowing the transmission of the signal with a higher robustness against distortions compared to the default transmission mode.

3. The integrated sensor device according to claim 2, wherein the transmitter circuit is configured to transmit in a predetermined transmission mode after at least one of a power-up of the integrated sensor device, an initialization of the integrated sensor device and in the absence of a signal indicating a request to change the transmission mode.

4. The integrated sensor device according to claim 2, wherein the at least one further transmission mode comprises, compared to the default transmission mode, at least one of a reduced transmission speed of a signal to be transmitted, a larger amplitude of the signal to be transmitted, using an error detection code allowing an error detection, using an error detection code allowing an improved error detection, changing a frame structure of the signal to be transmitted, changing a transmission sequence of different or redundant sensor devices, and repeating a message comprising a value of a quantity detected by the sensing element.

5. The integrated sensor device according to claim 2, wherein the plurality of transmission modes comprises a plurality of further transmission modes.

6. The integrated sensor device according to claim 1, wherein the communication interface is configured to transmit a signal asynchronously.

7. The integrated sensor device according to claim 1, wherein the communication interface is further configured to transmit using an amplitude modulation scheme, a Manchester modulation scheme, a transmission scheme based on modulating a current level of a signal to be transmitted, or a transmission scheme based on modulating a voltage level of a signal to be transmitted.

8. The integrated sensor device according to claim 2, wherein the communication interface is configured to use at least one of a PSI (Peripheral Sensor Interface) communication protocol, a SPC (Short Pulse Width Modulation Code) communication protocol, a SENT (Single Edge Nibble Transmission) communication protocol, a LIN (Local Interconnect Network) communication protocol, and a DSI (Digital Serial Interface) communication protocol.

9. A control unit comprising:
a receiver circuit configured to receive a signal, indicating a value sensed by a sensor device, using at least a pulse-width-modulation scheme;
a monitor circuit configured to be coupled to the receiver circuit and to monitor a quality of the received signal; and
a transmitter circuit configured to be coupled to the monitor circuit and to transmit a signal indicating a request to change a transmission mode, when the monitored quality of the received signal indicates at least one of a degradation of the received signal, an improvement of the quality of the received signal and a constant quality of the received signal;
wherein the transmitter circuit is configured to transmit the signal indicating the request to change the transmission mode to a transmission mode with a higher robustness against distortions, when the monitored quality of the received signal indicates degradation of the received signal.

10. The control unit according to claim 9, wherein the monitor circuit is configured to monitor the quality of the received signal based on a statistical analysis.

11. The control unit according to claim 9, wherein the monitor circuit is configured to monitor the quality of the received signal based at least on one of a verification of an error detecting code, monitoring a timing variation of the received signal, monitoring a message counter comprised in the received signal, and detecting a missing message or a part thereof.

12. The control unit according to claim 9, wherein the transmitter circuit is configured to transmit the signal indicating the request to change the transmission mode to transmit with a higher or a lower robustness against distortions compared to a predetermined transmission mode the sensor device operates in after at least one of a power-up of the sensor device, an initialization of the sensor device and in the absence of a signal indicating the request to change the transmission mode.

13. The control unit according to claim 12, wherein the transmission mode allowing the sensor device to transmit with a higher robustness as indicated by the signal is, compared to the predetermined transmission mode of the sensor device, configured to at least one of transmitting a signal with a reduced transmission speed of the signal, transmitting a signal with a larger amplitude of the signal, transmitting a signal using an error detection code allowing an error detection, transmitting a signal using an error detection code allowing an improved error detection, changing a frame structure, changing a transmission sequence of different or redundant sensor devices, and transmitting a signal comprising repeating a message comprising a value of a quantity detected by the sensor device.

14. The control unit according to claim 12, wherein the transmitter circuit is configured to transmit the signal indicating the request to change to one transmission mode of the sensor device of a plurality of transmission modes of the sensor device, wherein the plurality of transmission modes comprises the predetermined transmission mode and a plurality of further transmission modes.

15. The control unit according to claim 9, wherein the transmitter circuit is configured to transmit the signal indicating a request to change the transmission mode to a transmission mode with a lower robustness against distortions, when the monitored quality of the received signal indicates at least one of an improvement of the quality of the received signal and a constant quality of the received signal.

16. The control unit according to claim 9, wherein the receiver circuit comprises an input filter comprising a filter characteristic based on a changeable corner frequency, and wherein receiver circuit is configured to decrease the corner frequency, when the signal indicates a request to change to a transmission mode allowing to transmit a signal at a reduced transmission speed.

17. The control unit according to claim 9, wherein the receiver circuit comprises a spike filter comprising a filter characteristic based on a changeable maximum time, and wherein the receiver circuit is configured to increase the maximum time, when the signal indicates a request to change to a transmission mode allowing to transmit a signal at a reduced transmission speed.

18. The control unit according to claim 9, wherein the control unit is configured to provide the sensor device with electrical power and to increase the electrical power provided to the sensor device, when the monitored quality of the received signal indicates a degradation of the quality of the received signal.

19. The control unit according to claim 9, wherein the receiver circuit is configured to receive a signal asynchronously.

20. The control unit according to claim 9, wherein the receiver circuit is further configured to receive the signal using an amplitude modulation scheme, a Manchester modulation scheme, a transmission scheme based on modulating a current level of the received signal, or a transmission scheme based on modulating a voltage level of the received signal.

21. A method comprising:
providing a sensor device with electrical power;
receiving a signal, using at least a pulse-width-modulation scheme, indicating a value of a quantity from the sensor device;
monitoring a quality of the received signal; and
increasing the electrical power provided to the sensor device, when the monitored quality of the received signal indicates a degradation of the quality of the received signal.

22. A control unit comprising:
a receiver circuit configured to receive a signal, indicating a value sensed by a sensor device, using at least a pulse-width-modulation scheme;

a monitor circuit configured to be coupled to the receiver circuit and to monitor a quality of the received signal; and a transmitter circuit configured to be coupled to the monitor circuit and to transmit a signal indicating a request to change a transmission mode, when the monitored quality of the received signal indicates at least one of a degradation of the received signal, an improvement of the quality of the received signal and a constant quality of the received signal, wherein:

the receiver circuit is configured to receive signals from a plurality of sensor devices, the monitor circuit is configured to monitor the quality of the plurality of received signals, and the transmitter circuit is configured to transmit the signal indicating the request to change the transmission mode to at least one of the sensor devices of the plurality of sensor devices, a group of sensor devices comprising at least two different sensor devices of the plurality of sensor devices, and all sensor devices of the plurality of sensor devices.

23. A control unit comprising:

a receiver circuit configured to receive a signal, indicating a value sensed by a sensor device, using at least a pulse-width-modulation scheme, wherein the receiver circuit is configured to use at least one of a PSI (Peripheral Sensor Interface) communication protocol, a SPC (Short Pulse Width Modulation Code) communication protocol, a SENT (Single Edge Nibble Transmission) communication protocol, a LIN (Local Interconnect Network) communication protocol, and a DSI (Digital Serial Interface) communication protocol;

a monitor circuit configured to be coupled to the receiver circuit and to monitor a quality of the received signal; and a transmitter circuit configured to be coupled to the monitor circuit and to transmit a signal indicating a request to change a transmission mode, when the monitored quality of the received signal indicates at least one of a degradation of the received signal, an improvement of the quality of the received signal and a constant quality of the received signal.

* * * * *